Dec. 24, 1963 A. P. GREEN ETAL 3,114,971

PREPARATION OF MAGNETIC OXIDE COATINGS

Filed March 24, 1961 2 Sheets-Sheet 1

INVENTORS
ALBERT P. GREEN
ALVIN W. FRIDLEY
BY [signature]
ATTORNEY

INVENTORS
ALBERT P. GREEN
ALVIN W. FRIDLEY
BY
ATTORNEY

United States Patent Office 3,114,971
Patented Dec. 24, 1963

3,114,971

PREPARATION OF MAGNETIC OXIDE COATINGS

Albert P. Green and Alvin W. Fridley, Van Nuys, Calif., assignors to Warner Bros. Pictures, Inc., New York, N.Y., a corporation of Delaware Filed Mar. 24, 1961, Ser. No. 98,093
7 Claims. (Cl. 29—566)

This invention relates to signal recording and reproducing apparatus and particularly to the production and preparation of magnetic tape or film for recording and reproducing signals.

It is well known that signal recording, particularly sound recording, is done with magnetic oxide coatings on plastic, paper, or similar types of bases either in the form of a complete magnetic oxide coating of all of one surface of the base or coatings in the form of stripes. In coating a base, liquid magnetic oxide material is flowed on as the base is advanced past a flat narrow nozzle or nozzles, after which it is run through a drying cabinet. The magnetic coating is composed of small crystalline particles which result in a rough surface. Since sound recording and reproduction is accomplished by magnetic transducers having cores with narrow gaps over which the magnetic coating passes, it is realized that the pole pieces at the magnetic gap will not contact all portions of a rough surface of the magnetic coating. Since the impression of a signal on the head during recording provides small magnets in the coating which vary in size and position, depending on the frequency and amplitude of the signal, a high frequency signal of low amplitude will lie close to the surface of the coating. Thus, if the coating surface is rough, a high frequency small amplitude signal will not induce a desirable uniform magnetism in the coating since the pole pieces will vary in position along the surface of the coating.

With the present invention, the surface of a magnetic coating is burnished in a manner and with apparatus which greatly improves the quality of recording and reproduction of the signals. That is, instead of the frequency characteristic drooping toward the high frequency end of the spectrum, a substantially flat frequency characteristic is obtained. The burnishing is accomplished by the use of a rotary file which has teeth of a particular type and which rotates at a certain speed with respect to the speed of movement of the magnetic coating. An electrical control is provided which permits the tape to move prior to the rotation of the rotary file so as not to provide any low spots on the coating. The teeth of the file are not only arranged in a helic but the front surface of each tooth is parallel with a line through the axis of the file so that each tooth has a zero radial rake. The files may be of various widths so that for a fully coated film or tape, the teeth will extend across the entire surface of the file. However, when striped film is to be burnished, the file is recessed in portions corresponding to the portions of the tape having no magnetic stripes thereon to prevent scratching of the base.

The principal object of the invention, therefore, is to facilitate the production and preparation of magnetic oxide coated films or tapes used for signal recording and reproduction.

Another object of the invention is to provide an improved magnetic coating by specially burnishing the surface thereof before use for signal recording.

A further object of the invention is to provide improved apparatus for rapidly and specially burnishing the surface of magnetic oxide coatings.

A better understanding of this invention may be had from the following description when read in connection with the accompanying drawings, in which.

Figure 1:
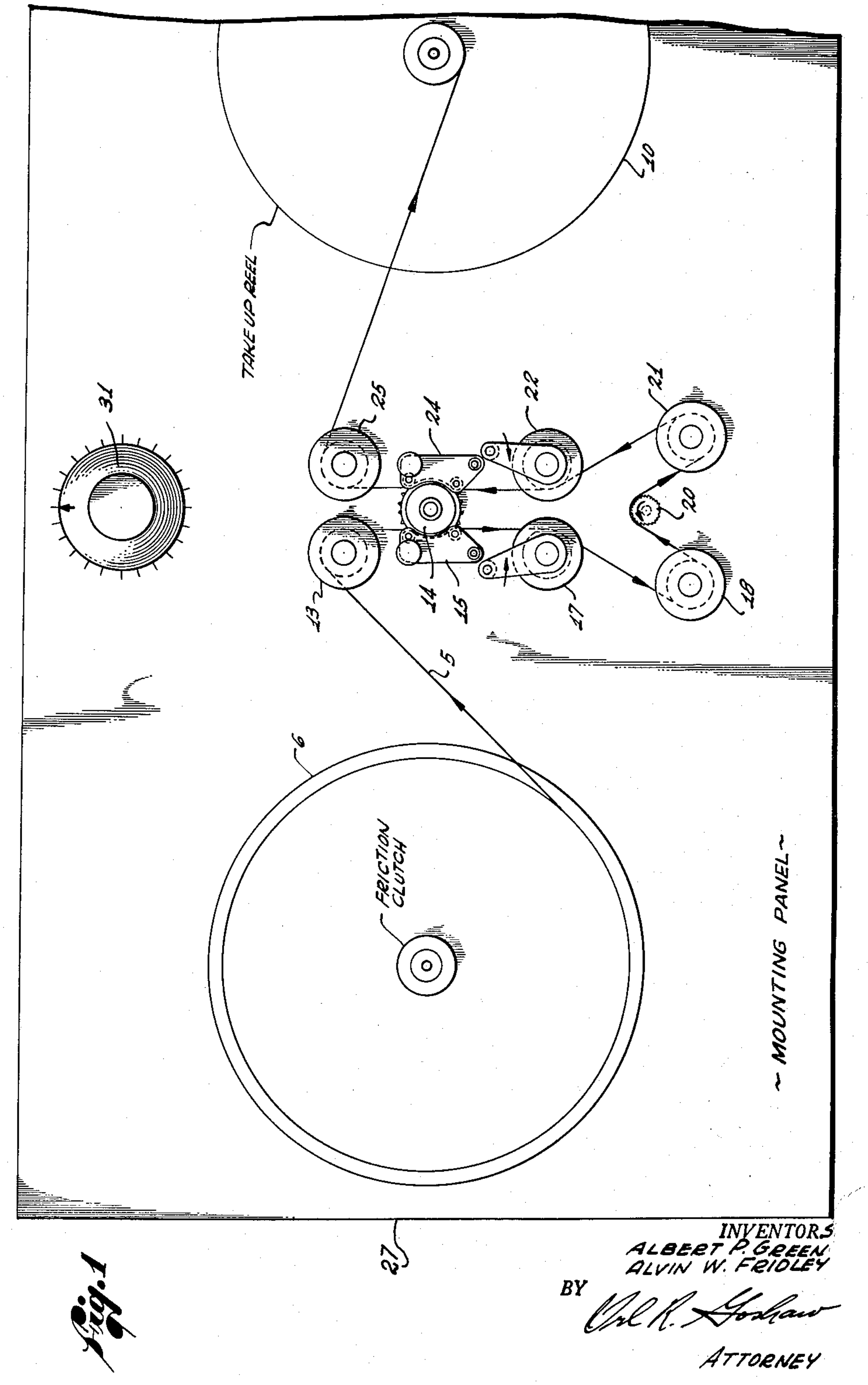
FIG. 1 is an elevational view of apparatus embodying the invention.

Referring, now, to the drawings in which the same numerals refer to the same elements, a newly coated magnetic tape 5 is shown between a supply reel 6 having a friction clutch 7 on its hub and a takeup reel 10 which is driven by a torque motor 11 (see FIG. 6), the tape travelling in the direction of the arrows. Between the two reels 6 and 10, the tape passes over a guide roller 13, one side of sprocket 14 under a pad roller 15, around a spring tensioning roller 17, a guide roller 18, over a rotary file 20 adapted to rotate in the direction shown by the arrow so that its surface is moving opposite to the surface of the tape, over guide roller 21, tensioning roller 22, over the other side of sprocket 14 under pad roller 24 and over guide roller 25 to the reel 10. The tape is thus held taut between the sprocket 14 and rotary file 20 by the tensioning rollers 17 and 22 which are urged together by springs in the direction shown by the arrows. The above described elements are mounted in any suitable manner such as on a panel or wall 27.

By positioning the rotary file 20 as shown, practically one-third of its surface, or 120 degrees of its surface, is in contact with the tape, which is a feature in combination with the relative speeds of the file and tape and the form and shape of the teeth of the file that provide a very smooth surface to the magnetic oxide coating.

Figures 6, 7:
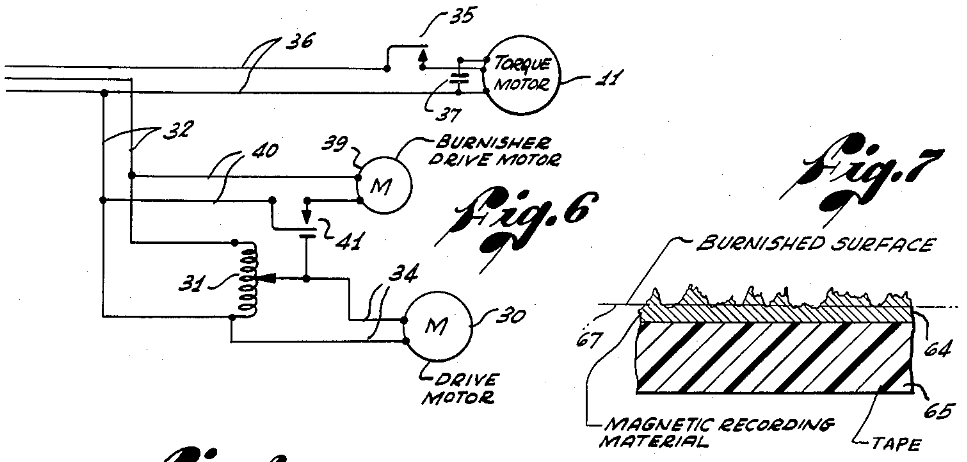
FIG. 6 is a diagrammatic view of the electrical control system embodied in the invention.
FIG. 7 is a magnified cross-sectional view of a section of the coated film when originally produced.

By referring to FIG. 6, a motor 30 drives the sprocket 14 when the arm of a powerstat 31 in the form of an autotransformer is moved, power being supplied from one side 32 of a single-phase 220-volt A.C. supply, the powerstat being connected to the motor over conductors 34. As soon as the film is threaded as shown in FIG. 1, one of the rollers 13 or 25, being spring-biased and movable, closes a threading switch 35 which connects the torque motor 11 over the 220-volt single-phase supply 36 of the source. A phase shifting condenser is shown at 37. Although the torque motor 11 is energized, it will not turn reel 10 until motor 30 turns sprocket 14 to advance the film.

The rotary file 20 is driven by a motor 39 which is connected to conductors 32 of the single-phase source over conductors 40 and a microswitch 41 which is closed by the arm of the powerstat 31 after the tape has been brought up to speed by motor 30. If the rotary file motor were energized simultaneously with the energization of the drive motor 30, low spots on the magnetic coating would result. Thus, the film is brought up to speed before the motor driving the rotary file is energized.

Figures 2, 3, 4, 5:
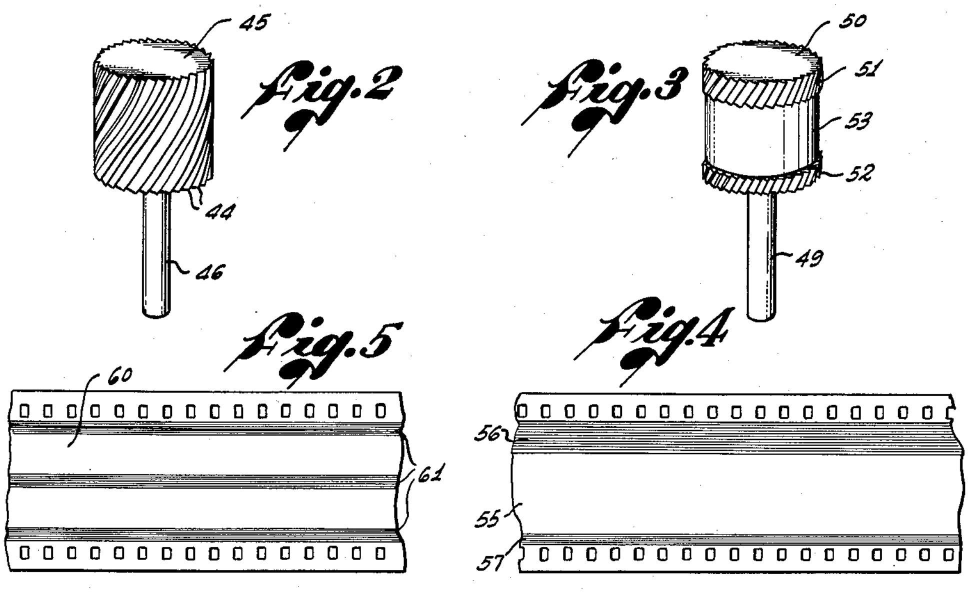
FIG. 2 is a perspective view of one form of rotary file used in the invention.
FIG. 3 is a perspective view of another form of rotary file used in the invention.
FIG. 4 is a plan view of a portion of film carrying one signal track and a balancing stripe.
FIG. 5 is a plan view of film having three signal recording stripes thereon.

Referring, now, to FIGS. 2 and 3, the rotary file used in the invention is shown having helical teeth 44 cut on the surface of a steel cylinder 45 mounted on a shaft 46 which is connected to the motor 39. The file shown in FIG. 2 has the teeth over the entire surface, while the file shown in FIG. 3 with its shaft 49 and cylinder 50 has a row of helical teeth 51 on one edge and a narrower row of helical teeth 52 on the other edge, a recess 53 being provided between the two rows of teeth. As mentioned above, this recess prevents contact between the file and the base on which the magnetic material is coated and protects the base from scratches. Thus, the file shown in FIG. 2 could be used for film having a coating over its complete surface, while the file shown in FIG. 3 could be used for a tape 55 shown in FIG. 4 with a signal stripe 56 and a balancing stripe 57. For a three-stripe tape, such as shown at 60 in FIG. 5, having three similar signal stripes 61, a file having three rows of helical teeth similar to the row 51 in FIG. 3 with separating recesses would be used.

Figure 8:
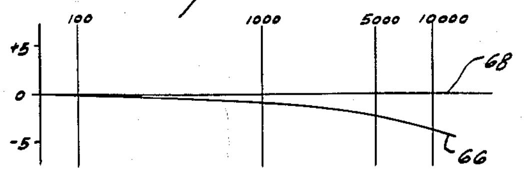
FIG. 8 is a graph showing the change in frequency characteristic accomplished by use of the invention.

When the film is first coated, the surface of the coating 64 on its base 65 would appear as shown in FIG. 7. In this figure, the surface of the film is shown ragged with sharp points of different heights, and if such a film were used for recording, it would have a frequency characteristic as shown at 66 in FIG. 8, which, as illustrated, shows a drop of approximately 3 to 5 db in the neightborhood of 10,000 cycles. This characteristic is undesirable for the recording of high fidelity sound, particularly in the audio range. Thus, by use of the invention, the roughness of the surface is burnished to the level shown by the dot-and-dash line 67 in FIG. 7, which will raise the frequency characteristic to that shown by the flat curve 68 in FIG. 8.

Figure 9:
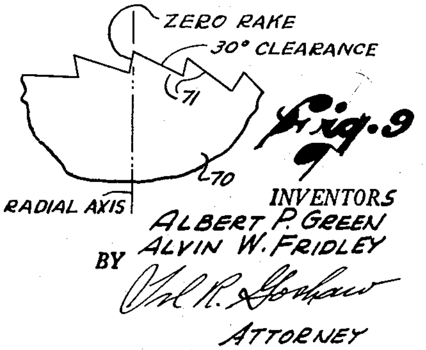
FIG. 9 is an enlarged fragmentary view of several teeth of the rotary file used in this invention.

To obtain a burnishing action rather than a cutting action, although the tool is called a rotary file, the teeth of the file are so shaped that a radial line from the axis of the file will lie in the front surface of each tooth. This is called zero radial rake of a plain milling cutter. The form of the teeth 71 is shown in FIG. 9 in a section 70 of a rotary file. Furthermore, the teeth are arranged in a helical form to provide a transverse motion which enhances the burnishing action. Another feature which provides the special burnishing action and a particularly smooth surface is the relative speeds of the surface of the coating with respect to the speed of the surface of the rotary file and the fact that they are travelling in opposite directions. The sprocket advances the film between the reels at a speed of approximately 250 feet a minute, while a one inch diameter file is rotated at a speed of 5000 r.p.m., which corresponds to approximately 1300 feet per minute of surface travel. Thus, by using a one inch diameter file having 36 teeth and contacting the coating over approximately one-third of its surface, each transverse element of the coating will be contacted by approximately 68 teeth of the file.

It was found that this relationship of a high surface speed for the rotary file compared with the speed of the magnetic coating provides not only a rapid burnishing action to permit a large amount of film to be burnished in a short period of time, but also places a substantially perfect flat surface on the coating so that the first use of the film for recording signals provides the desired flat frequency characteristic of the signal. Since the reproduction of the sound untilizes magnetic heads of the same general type as the recording heads, better detection of the signal is also obtained from a smooth surface tape rather than from a freshly coated one.

We claim:

1. Magnetic oxide-coated tape burnishing apparatus comprising a mounting panel, a supply reel and a takeup reel on said panel, means on said panel adapted to advance said magnetic oxide coated tape between said reels, means on said panel adapted to tension said tape between said reels, a rotary file on said panel over which said tape is adapted to be advanced, means on said panel adapted to rotate said file, means for positioning said tape on substantially one-third of the surface of said file, and electrical control means for advancing said tape prior to the rotation of said file.

2. Magnetic tape burnishing apparatus in accordance with claim 1 in which said tape advancing means is a motor for advancing said tape at a speed of approximately 250 feet a minute and said file-rotating means is a second motor for rotating said file at a surface speed of approximately 1300 feet per minute.

3. Magnetic tape burnishing apparatus in accordance with claim 1 in which said file is provided with a helical arrangement of teeth having a front surface parallel with the line from the axis of said file to said front surface.

4. Magnetic tape burnishing apparatus in accordance with claim 1 in which said file has parallel rows of teeth.

5. A magnetic oxide burnishing apparatus comprising a mounting panel, a supply reel for said tape, a takeup reel for said tape, means for driving said takeup reel, means for advancing and controlling the advancement of said tape, said means including a sprocket, a pair of tensioning rollers and a pair of guide rollers, said tape being adapted to pass from one side of said sprocket around one of said tensioning rollers, around said guide rollers, around the other of said tensioning rollers and on the other side of said sprocket to form a tensioned loop, a rotary file positioned between said guide rollers and over which said tape is adapted to be advanced, said file rotating in the opposite direction to the direction of advancement of said tape thereover, the position of said guide rollers with respect to said file being adapted to position said tape over approximately one-third of the surface of said file, means for rotating the surface of said file at a speed of approximately five times the speed of the surface of said tape over said file, all of said elements being mounted on said panel.

6. A magnetic oxide burnishing apparatus in accordance with claim 5 in which said file is provided with a plurality of helically-arranged sawtoothed teeth, the front surface of which is substantially parallel with the line from the axis of said file to said teeth.

7. A magnetic oxide burnishing apparatus in accordance with claim 5 in which are provided means for energizing said means for driving said sprocket prior to the energization of said means for rotating said file.

References Cited in the file of this patent

UNITED STATES PATENTS

| | | |
|---|---|---|
| 64,505 | Doolittle | May 7, 1867 |
| 126,390 | Hall | May 7, 1872 |
| 573,853 | Bird | Dec. 29, 1896 |
| 1,135,996 | Diefenback | Apr. 20, 1915 |
| 1,194,617 | Gess | Aug. 15, 1916 |
| 1,443,426 | Melgers | Jan. 30, 1923 |
| 1,514,012 | Rambuscheck | Nov. 4, 1924 |
| 1,731,843 | De Gaaff | Oct. 15, 1939 |
| 2,250,398 | Schon | July 22, 1941 |
| 2,318,432 | Stainer | May 4, 1943 |
| 2,393,463 | Gottlieb | Jan. 22, 1946 |
| 2,633,431 | De Sylva | Mar. 31, 1953 |
| 2,672,119 | Ertner | Mar. 16, 1954 |
| 2,688,567 | Franck | Sept. 7, 1954 |
| 2,788,616 | Schulz | Apr. 16, 1957 |
| 2,790,229 | Hellstrom | Apr. 30, 1957 |
| 2,920,678 | Cummingham | Jan. 12, 1960 |
| 2,934,394 | Emslie | Apr. 26, 1960 |

OTHER REFERENCES

A Treatise on Milling and Milling Machines, 1951, pages 241–247, The Cincinnati Milling Machine Co.